Patented Nov. 12, 1946

2,410,916

UNITED STATES PATENT OFFICE 2,410,916

METHOD OF PRODUCING ZINC YELLOW

Edwin A. Wilson, Rutherford, and William D. Newman, Elizabeth, N. J., assignors to Interchemical Corporation, New York, N. Y., a corporation of Ohio No Drawing. Application May 27, 1941, Serial No. 395,368

5 Claims. (Cl. 23—56)

This invention relates to the pigment known as zinc yellow, which is a basic hydrated potassium zinc chromate, and has particular reference to a simple, economical method of preparing this pigment.

Zinc yellow (generally considered to be $K_2O \cdot 4ZnO \cdot 4CrO_3 \cdot 3H_2O$) is a pigment which finds its principal application in the manufacture of metal paints, in particular priming coats for use under other paints. The pigment has unusual rust-inhibiting qualities, apparently due to the fact that it has a very slight solubility in water, so that when water penetrates a paint film, it reacts with the pigment to produce a complex which tends to render the iron passive.

The conventional method for manufacturing the pigment is to mix a pigment grade zinc oxide with a solution of potassium dichromate and then slowly add sulfuric acid. This method produces a pigment which is useful as a rust-inhibitive material but, on account of the difficulty in controlling the process, the pigment varies considerably from batch to batch in color and strength. Color and strength are important in some applications of the pigment. Furthermore, the process is expensive.

Various improvements of this method have been suggested, such as, for example, the treatment of a zinc hydroxide precipitate in a zinc sulfate solution, with potassium dichromate and potassium chloride; but these proposed processes seem to have no substantial advantage over the conventional method.

We have discovered that a pigment zinc yellow of unusually good pigment properties can be obtained simply and economically by a direct precipitation of a solution of a soluble zinc salt with a solution of a soluble chromate, in the presence of potassium and hydroxyl ions. In order to get material with satisfactory pigment properties, the ratios of the reacting ingredients are kept within rather narrow limits. The same method can be used for an essentially similar pigment in which the potassium is replaced by ammonium in the pigment.

Using zinc as a basis, we have found that in order to get satisfactory pigment properties, there must be reacted from 0.8 to 1.0 chromate ions for each zinc ion, and at least 0.5 potassium ion for each zinc ion (or of ammonium ions to make the ammonium pigment). Furthermore, from 0.5 to 0.875 hydroxyl ion should be used for each chromate ion. If these limits of hydroxyl to chromate are exceeded in either direction, poor yields are obtained due to the solubility of the product in substantially acid solutions (pH below about 6.0), and in alkaline solutions (pH above about 7.0); our preferred ratios of reactants provide a final pH of between about 6.0 and 6.6. Moreover, where too little hydroxyl is present, the product is undesirably greenish and dirty in shade, and weak; too much hydroxyl likewise products a dirty weak pigment.

In conducting the precipitation, the ratio of hydroxyl to chromate should never be allowed to get over 0.875 to 1.0; if this occurs, the ratio of zinc to chromate in the final pigment is disturbed, and poor pigment is obtained. Hence, the precipitation is preferably conducted by adding the three solutions (zinc salt, chrome salt, alkali) simultaneously, or by mixing the chrome salt and alkali solutions, and then admixing with the zinc salt solution. It cannot be prepared by mixing zinc and alkali solutions and then adding chromate, or by adding a mixture of zinc and chromate solution to an alkali solution.

The zinc ions can be obtained from any soluble zinc salt—e. g. the sulfate, nitrate, chloride, etc. The chromate ion may be obtained by the use of a soluble chromate or dichromate—e. g. potassium and sodium chromates, potassium and sodium bichromates, chromic acid, etc. The hydroxyl ions can be obtained by the use of caustic soda or caustic potash, soda ash, ammonia, etc.; where a dichromate or chromic acid is used as the source of chromate ion, sufficient extra alkali must of course be used to convert the chromium to chromate, and to yield the necessary free hydroxyl for the reaction.

Typical examples of our invention are the following:

Example 1

A solution of 640 pounds of potassium bichromate and 300 pounds of caustic soda in 600 gallons of water at 85° F., is placed in a striking tank provided with an agitator. The pH of the solution is 12.1. To this solution is added a solution of 804 pounds of anhydrous zinc sulfate in about 400 gallons of water (350 to 500 gallons) at about 75° F. When the zinc sulfate is all in, the pH is about 6.2; the color of the pigment is reddish yellow, and a substantial quantity of chromate ion is free in solution. The mixture is stirred for about 15 hours; the excess of chromate almost disappears, and the precipitate becomes yellower and lighter. This pigment, on filtration, washing and drying, will be commercially uniform from batch to batch, having reasonably uniform tinting strength and color, and approximating the composition $K_2O \cdot 4ZnO \cdot 4CrO_3 \cdot 3H_2O$.

The ingredients in the above example yield about 5 molar equivalents of zinc ions, 4.35 molar equivalents of potassium ions, 4.35 molar equivalents of chromate ions and 3.15 molar equivalents of hydroxyl ions (2.175 mols of dichromate reacting with 7.5 mols of caustic soda to give 4.35 of chromate and 3.15 of residual caustic soda); the ions ratios are about as follows Chromate to zinc _____ $\frac{4.35}{4.98}$=0.87 to 1.0

Potassium to zinc _____ $\frac{4.35}{4.98}$=0.87 to 1.0

Hydroxyl to chromate _____ $\frac{3.15}{4.35}$=0.725 to 1.0

*Example 2*

| | Pounds |
|---|---|
| $K_2Cr_2O_7$ | 690 |
| NaOH | 300 | are dissolved together in 600 gallons of water at 85° F. (pH 12.2).

Strike in 30 minutes with 807 pounds of zinc sulfate in 500 gallons of water at 85° F. (pH 3.0).

Stir until equilibrium is reached (8–15 hours). Press and wash in press. Dry at 200° F. pH at end of strike 6.3. pH at end of stir 6.6.

Obviously since more NaOH is used than is required to convert all of the $K_2Cr_2O_7$ to normal chromate, the same solution could be arrived at in a number of ways. For example—

| | Pounds |
|---|---|
| $K_2CrO_4$ | 455 |
| $Na_2CrO_4 \cdot 10H_2O$ | 802 |
| NaOH | 112 | or

| | Pounds |
|---|---|
| $K_2Cr_2O_7$ | 690 |
| NaOH | 300 | or

| | Pounds |
|---|---|
| $Na_2Cr_2O_7 \cdot 2H_2O$ | 700 |
| KOH | 264 |
| NaOH | 112 | etc.

The alkalinity may also be arrived at by a partial or complete substitution of the hydroxide by carbonates.

All of the above mixtures give substantially the same molar equivalents of zinc ions (5.0) potassium ions (4.70) chromate ions (4.70) and hydroxyl ions (2.8). The ratios are Chromate to zinc _____ 0.94 to 1.0
Potassium to zinc _____ 0.94 to 1.0
Hydroxyl to chromate _____ 0.56 to 1.0

*Example 3*

| | Pounds |
|---|---|
| $Na_2Cr_2O_7 \cdot 2H_2O$ | 700 |
| KOH | 264 |
| NaOH | 112 | are dissolved together in 600 gallons of water at 85° F. (pH 12.2).

Strike in 30 minutes with 681 pounds of zinc chloride in 500 gallons of water at 85° F. (pH 3.0).

Stir until equilibrium is established.

Press and wash in press. Dry at 200° F. pH at end of strike 6.3. pH at end of stir 6.6.

The ratios of ions are substantially equal to these of example 2. Changes can obviously be made in the specific examples without departing from the spirit of the invention, which is defined in the claims.

We claim:

1. The method of making zinc yellow which comprises preparing a solution of a soluble zinc salt, preparing a second solution containing chromate ions, and a third solution containing hydroxyl ions, one of the solutions containing potassium ions, in the ratio of at least 0.5 molar equivalent of potassium and from 0.8 to 1.0 molar equivalent of chromate per molar equivalent of zinc, and 0.5 to 0.875 molar equivalent of hydroxyl per molar equivalent of chromate, and passing the solutions simultaneously and in the above molar ratio of ingredients into a precipitating tank, whereby zinc yellow of high color value and good color is precipitated.

2. The method of making zinc yellow which comprises directly precipitating a solution of a zinc salt with a solution of soluble chromate in the presence of hydroxyl ions and of alkali ions including alkali ions selected from the group consisting of potassium and ammonium ions, characterized by the use in the reaction of 0.8 to 1.0 molar equivalent of chromate ions, and at least 0.5 molar equivalent of alkali ions of the group consisting of potassium and ammonium ions, per molar equivalent of zinc ions, and from 0.5 to 0.875 molar equivalent of hydroxyl ions per molar equivalent of chromate ions, precipitation of zinc hydroxide and highly basic zinc chromates being avoided by obtaining first precipitation in the reaction in a mixture where the molar ratio of hydroxyl ions to chromate ions is between 0.5 and 0.875 to 1.0, and by maintaining the molar ratio of hydroxyl ions to chromate ions below 0.875 to 1.0 throughout the reaction.

3. The method of making zinc yellow which comprises directly precipitating a solution of a zinc salt with a solution of a soluble chromate in the presence of hydroxyl ions and of alkali ions including potassium ions, characterized by the use in the reaction of 0.8 to 1.0 molar equivalent of chromate ions, and at least 0.5 molar equivalent of potassium ions, per molar equivalent of zinc ions, and from 0.5 to 0.875 molar equivalent of hydroxyl ions per molar equivalent of chromate ions, precipitation of zinc hydroxide and highly basic zinc chromates being avoided by obtaining first precipitation in the reaction in a mixture where the molar ratio of hydroxyl ions to chromate ions is between 0.5 and 0.875 to 1.0, and by maintaining the molar ratio of hydroxyl ions to chromate ions below 0.875 to 1.0 throughout the reaction.

4. The method of making zinc yellow which comprises preparing a solution of a soluble zinc salt, preparing a second solution containing chromate ions, alkali ions including potassium ions, and hydroxyl ions, in the ratio of at least 0.5 molar equivalent of potassium and from 0.8 to 1.0 molar equivalent of chromate per molar equivalent of zinc, and 0.5 to 0.875 molar equivalent of hydroxyl per molar equivalent of chromate, and adding the zinc solution to the alkaline chromate solution, whereby zinc yellow of high color value and good color is precipitated.

5. The method of making zinc yellow which comprises preparing a solution of a soluble zinc salt, preparing a second solution containing chromate ions, alkali ions including potassium ions, and hydroxyl ions, in the ratio of at least 0.5 molar equivalent of potassium and from 0.8 to 1.0 molar equivalent of chromate per molar equivalent of zinc, and 0.5 to 0.875 molar equivalent of hydroxyl per molar equivalent of chromate, and passing the solutions simultaneously and in the above molar ratio of ingredients into a precipitating tank, whereby zinc yellow of high color value and good color is precipitated.

EDWIN A. WILSON.
WILLIAM D. NEWMAN.